United States Patent [19]
Weber

[11] 4,219,799
[45] Aug. 26, 1980

[54] VEHICULAR SIGNAL APPARATUS

[76] Inventor: Harold J. Weber, 20 Whitney Dr., Sherborn, Mass. 01770

[21] Appl. No.: 954,178

[22] Filed: Oct. 24, 1978

[51] Int. Cl.$^2$ .............................................. G08B 3/00
[52] U.S. Cl. ................................ 340/52 R; 340/328; 340/384 R
[58] Field of Search ............... 340/52 R, 56, 62, 66, 340/384 R, 384 E, 328, 329; 179/84 T

[56] References Cited
U.S. PATENT DOCUMENTS

| | | | |
|---|---|---|---|
| 3,315,249 | 4/1967 | Clements | 340/329 |
| 3,688,293 | 8/1972 | Sullivan | 340/328 |
| 3,931,621 | 1/1976 | Rose | 340/384 E |

Primary Examiner—Thomas A. Robinson

[57] ABSTRACT

My invention teaches a vehicular signal apparatus, in particular a motor vehicle horn system, which has two successive loudness levels of operation. The first loudness level is a moderate level used as a brief "toot" to give a quick alert, as in pedestrian traffic or the like. The second loudness level is a commanding level used as a blast, as for example, in an emergency maneuver in heavy traffic. Operation is automatic, in the sense that a brief operator activation of the horn signal switch will result only in the activation of the moderate level horn, whereas operation of the blast horn is delayed such that continuous operator activation of the horn signal switch will cause the blast horn to blow within about a second after horn switch contact is made.

13 Claims, 7 Drawing Figures

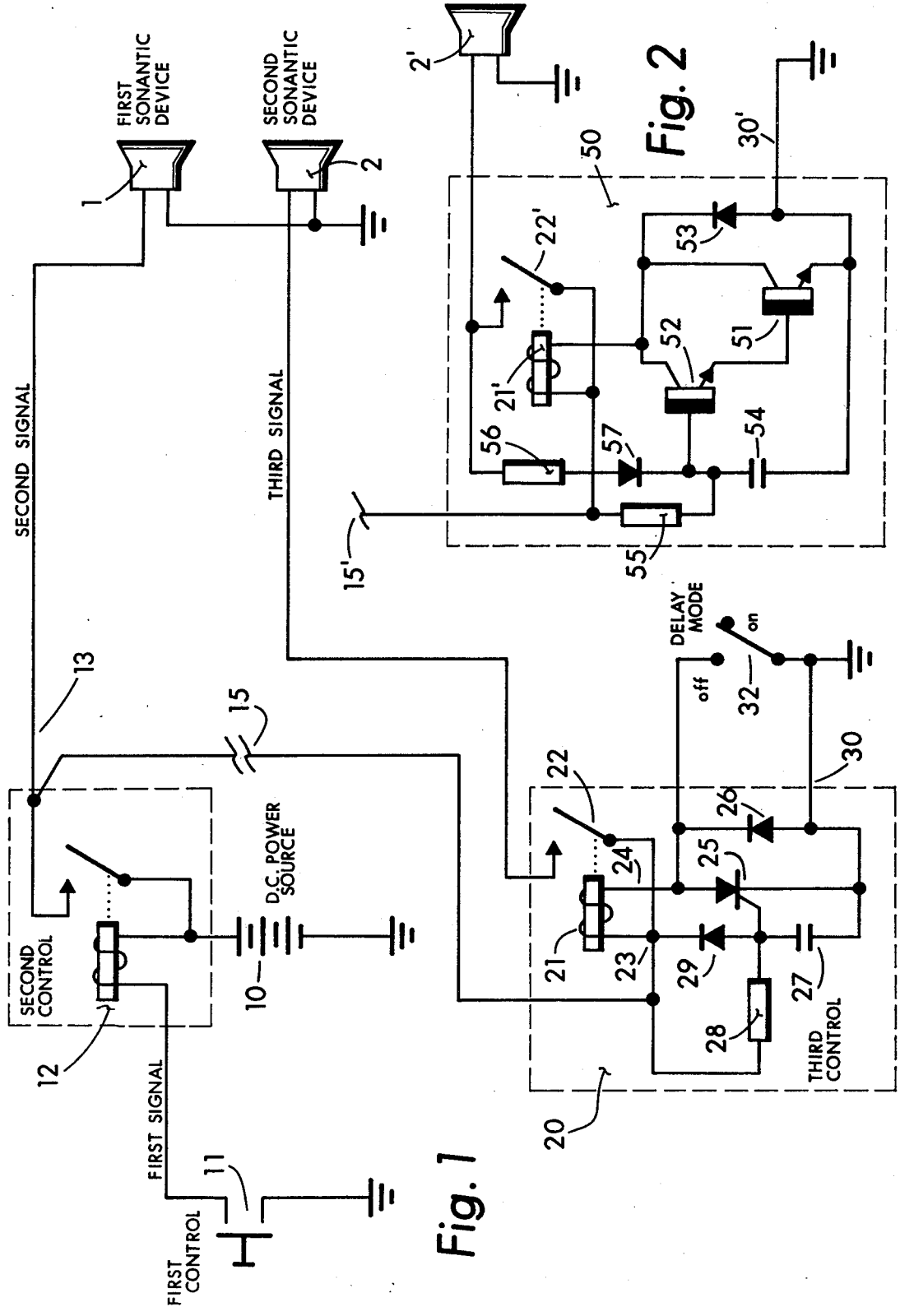

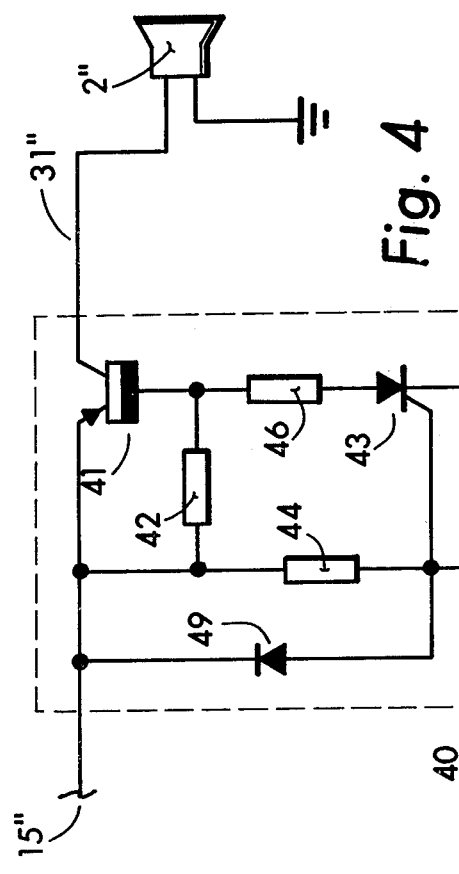
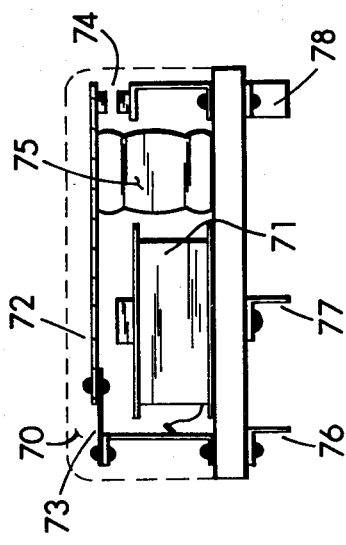
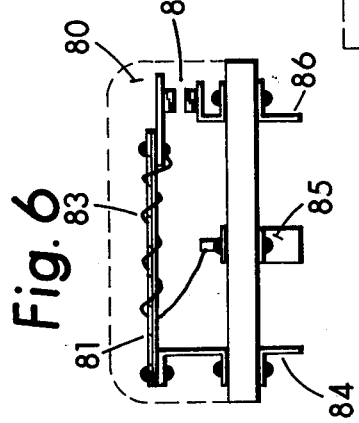
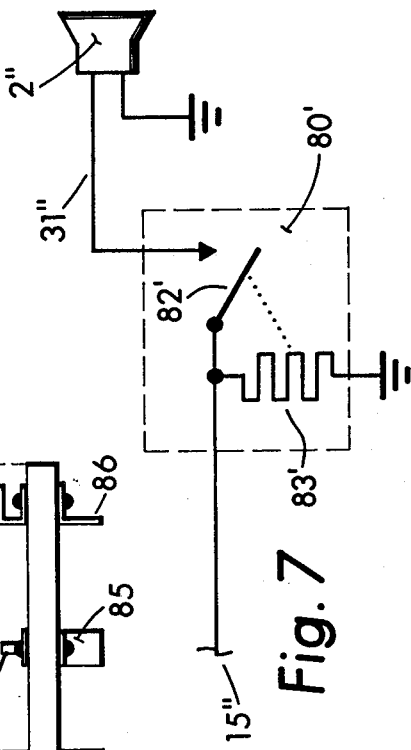
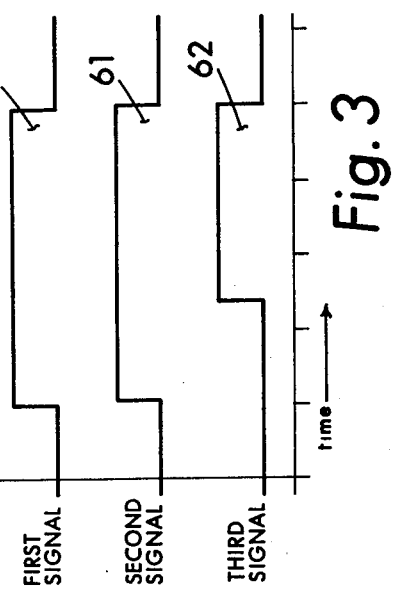

VEHICULAR SIGNAL APPARATUS

BACKGROUND OF INVENTION

The use of vehicular signaling horn apparatus is commonly practiced as a warning device for calling the attention of other vehicle operators, pedestrians, and animals to an impending hazard. As such the horn means is frequently either too raucously loud, as for example when but a brief "toot" is desired to alert an unaware pedestrian, or else the horn is too uncommandingly weak, as in heavy traffic and more particularly in rain or snow where the apparent intensity is muffled. Previously, persons skilled in the art have taught the use of so-called "town and country" horns which are operator controlled for two or more different loudness levels by means of a selector switch. Such schemes however frequently lack effectiveness because the operator either forgets to change the selection to suit his driving conditions, or else happens upon an occurrence wherein he immediately needs control, other than that which he has selected. In so far as is known, no means exists for substantially automatic self-adjustment of the horn loudness level to suit the operator's demand as is taught in my present invention herewithin detailed and set forth.

Still other persons have taught novelty horn apparatus; that is, apparatus which plays a tune or is otherwise distinctive in its sound. However, these early horn control schemes do not, in effect, produce the result brought about by this invention; that being a relatively soft "toot" succeeded by a loud "honk" which continues so long as the horn is activated. On the contrary, the prior teachings tend to be about as loud in each part of their control sequence, with the pitch being the controlled parameter.

SUMMARY

A vehicular signaling apparatus is taught which, in its utile practice, cooperates with the horn, or like, warning signal device commonly employed with automobiles, trucks, and other such motor vehicles.

An advantage of this teaching is to provide a cautioning signal which is of a moderate acoustic level to serve as a mild warning.

Yet another advantage of this teaching is to provide a successive cautioning signal which is of raucous acoustic level to serve as a more exacting warning.

A substantial improvement brought forth in this teaching is the sequential, timely actuation of first the more moderate, then the more raucous acoustic level warning dependent upon how long the cautioning signal means is activated by the operator.

Most particularly, significant improvement is taught in that substantially at least two different warning signal levels are available to the operator without any operator intervention as to their availability other than the usual depression of a horn switch button or like control.

Still further advantage is provided in that the practice of my instant invention is compatible with existing twin horn systems as supplied over the years with millions of automobiles and other motor vehicles. No substantial wiring change or hardware installation is required to inexpensively implement the novelty, and safety feature, of this apparatus into new, or else existing vehicles.

DESCRIPTION OF FIGURES

FIG. 1 The first control and second control means are shown coupled to the first sonantic device; further shown is the third control means coupled to the second signal and therefrom coupling delayed third signal issue to the second sonantic device.

FIG. 2 A transistor circuit variation for the third control means is shown as a variation of the thyristor circuit given in FIG. 1.

FIG. 3 Timing diagram shows relationship of first, second, and third signals.

FIG. 4 Third control means employing transistor switch in lieu of electromechanical relay.

FIG. 5 Electromechanical third control means including dashpot delay means.

FIG. 6 Electromechanical third control means including thermal control bimetal contact actuator as delay means.

FIG. 7 Schematic for thermal delay means operative as third control means.

DESCRIPTION OF INVENTION

My instant invention is shown in FIG. 1 connected so as to be conjunctively cooperative with the typical cautioning signal, or horn circuit, used in modern motor vehicles. A first control means, or horn signal switch 11, which oftimes is mounted integral with, or as a part of, the steering wheel of the usual motor vehicle is shown. When activated by an operator, the first control means produces a first signal. The said first signal serves to operate a second control means, or relay 12, which connects with a battery 10 so as to close the therein provided contact means resulting in a second signal 13 to be principally coupled to first sonantic device, or horn 1, thereby producing a first, or moderate, loudness signal.

The second signal 13 also serves to connect to the third control means 20, which includes a relay 21 and contact means 22. One end 23 of the relay 21 coil connects 15 to the second signal 13, whilst the other end 24 of the coil connects principally to the anode of a silicon controlled rectifier 25, together with clamp diode 26 cathode. The cathode of the thyristor 25, together with clamp diode 26 anode connect substantially to the battery return circuit 30.

Operation is such that, when the first signal 13 is applied 15 to the third control means, the thyristor 25, for example a 2N5060, will be nonconductive. The inherent characteristic, well understood in the art, is that the s.c.r. has to be turned "on" by a gate signal. For the described device, such a signal is, typically:

$V_{GT} = 0.8$ volts (max.)
$I_{GT} = 200$ microamperes (max.)

to accomplish reliable gate controlled turn "on". The gate signal is provided by a time constant circuit comprising resistor 28, say 30,000 ohms, capacitor 27, say 30 microfarads. The resistor 28, being one endedly connected to the second signal 13, will serve to integratively charge capacitor 27 until the gate voltage $V_{GT}$ of the s.c.r. 25 has been exceeded, whereupon the s.c.r. will fire, or turn "on", thereby clamping the anode essentially to the cathode, or in this case, to ground. The result is that coil 21 will be energized resultingly closing contact 22 thereby producing the third signal "C" which serves to activate second sonantic device, or horn 2, therefrom producing a second loudness signal. The result is a third loudness signal which is effectively at least the combined total loudness of the first and second loudness signals.

The third control means also includes a diode 29 which serves to rapidly discharge capacitor 27 through the d.c. sneak path found through first sonantic device 1 in the event of early second signal 13 removal. A separate, operator controlled, switch means 32 is shown which will, when closed, serve to bypass the coil 21 connection 24 directly to ground thereby resulting in an immediate, undelayed, actuation of the second sonantic device whenever the first sonantic device is sounded. In effect, the switch 32 serves to over-ride the delay function.

FIG. 2 shows a circuit means employing transistor, instead of thyristor, device means to accomplish delay. As shown, transistors 51, 52 form a darlington pair. A capacitor 54, say 10 microfarads, in the base circuit of device 52 is charged through resistor 55, say 100,000 ohms, from the second signal 15' until a voltage, say about 1.4 volts accumulates at the terminals of capacitor 54 to turn the effective said transistor means "on", whereupon coil 21' will energize, closing contact set 22' and producing a third signal which serves to drive sonantic device 2'. Importantly, a resistor 56 and steering diode 57 serve to couple a portion of the said third signal directly to capacitor 54. Acting like positive feedback, the typically smaller value, say 10,000 ohms, of resistor 56 will rapidly reinforce any accumulated charge on capacitor 54 thereby causing the combined circuit to exhibit a "snap action" effect. An extension of contact set 22' life, together with less power dissipation in the said transistor means is therefrom realized. Diode 57, say 1N914, serves to block any reverse sneak path through the d.c. to ground path through horn 2' which might retard the charging action of resistor 55. While the resistor 56 and diode 57 are not essential to the practice of my invention, the said "snap action" effect they produce does serve to materially improve the life and reliability of the associated contact set 22' and therefore is most desirous in a practical application of my art.

FIG. 3 illustratively shows the timing sequence of the first signal 60, the substantially similiar timing sequence of second signal 61, and the purposefully delayed third signal 62. The delay of the initiation of the said third signal is usually pre-established, by apparatus parameters, to be on the order of 0.3 to perhaps 5 seconds depending on the preference of the operator in any particular application of my teachings.

A solid state switch means is shown in FIG. 4 as an alternate means to the relay device employed in either second control means 20 in FIG. 1, or second control means 50 in FIG. 2. As shown, the solid state second control means 40 consists principally of a semiconductor switch, or as exampledly shown, transistor 41. Operation is such that when a second signal occurs on input 15", transistor 41 and thyristor 43 are nonconductive. A timely charge accumulates on capacitor 47 through resistor 44 which, when the thyristor gate signal reaches sufficient magnitude, causes the s.c.r. 41 to turn "on" or conduct. The result is the s.c.r. anode circuit steers substantial current via resistor 46, say 50 ohms, and the base/emitter junction of transistor 41. The shown transistor, being a PNP device, say a 2N5893, will effectively be caused to turn "on" due to collector/emitter saturation, resulting in a third signal 31". Resistor 42, being of substantial value, say 1,000 ohms, serves to swamp the inherent collector/base leakage of device 41. Diode 49 serves a similiar capacitor 47 reset function as that described for a similiar diode 29 in FIG. 1. Diode 48 serves to provide about 0.7 volts cathode bias on s.c.r. 43 thus enhancing the reset characteristics produced by said diode 49.

FIG. 5 shows a pneumodynamic mechanism 70 serving as a delay, or third control means. A relay coil 71 is activated by connecting second signal 13 to terminal 76, whilst terminal 77 supporting the other end of the coil is grounded or otherwise returned to the battery. Coil energization results in a magnetic field pull on armature 72 which is supported, exampledly, by a hinge spring 73. The resulting force will cause the armature extension to press against dashpot means 75, for example a small fabrication of foam elastomer. The natural compressive resistance of the dashpot will retard the closure of contacts 74 which, when closed, serve to produce a third signal on terminal 78 which accordingly connects to horn means 2.

FIG. 6 shows a thermodynamic mechanism 80 serving as a delay, or third control means. A bimetal armature 81 supporting one member of a contact set 82 is surrounded by heater element 83. With terminal 85 grounded, the second signal as applied to terminal 84 will cause heating of the armature 81 by the element 83. The result is bimetal flexing of the armature 81 in such a way that contacts 82 close, resulting in a third signal output on terminal 86. Operation is still further improved upon in that when the third signal on terminal 86 is coupled to a typical vehicle horn 2, a substantial current, say around 4 amperes, will flow through the armature proper. Through proper proportioning of the mass of the bimetal armature, this current flow induces additional thermal rise in the bimetal member thereby reinforcing the contact 82 closure action.

FIG. 7 schematically represents the thermal delay means 80' described for FIG. 6. The second signal inputs 15" so as to heat element 83' which causes contacts 82' to delayedly close, the result of which is a third signal 31" which connects to second horn 2".

While I describe the instant invention in terms of several particular forms all employing electromechanical contact means for the second control means, the substitution of well known solid-state switch means, say transistor or thyristor devices instead is considered well known art and, therefore, within the scope of the invention.

While the warning signal means is described as a sonantic device, as a horn, this does not limit the utilitarian application of the teachings by the average person skilled in the art, and shall include therefore any signalling means as, say lights, bells, sirens, buzzers, or the like, which serve to effectuate the same result, that being to provide the operator with more than one value of signal level.

Use of my instant invention, while describedly is that of a horn on a motor vehicle which interpretation can mean an automobile, is not restrictively narrow in application but shall include the broad definition of a vehicular apparatus as any means in or by which someone or something is carried or conveyed.

While I have endeavored to show particular circuits, combinations of elements, and component parameters this is exhibited by way of providing a person of average skill in the art the teaching necessary to duplicate the fruits of my invention. In no way shall such particularistic description serve to limit the scope of the invention, but rather it shall serve merely to demonstrate the practicability of the invention.

The extension of my teaching to include additional third control means apparatus serially connected so as to create a sequential cascade of time delayed plural third signals for the operation of several separate sonantic devices in adjunct to the first and second sonantic device is considered merely an obvious elaboration of the substance of my invention.

What I claim is:

1. Vehicular signalling apparatus operative so as to provide at least a first signal, a second signal, and a third signal wherein said signals occur in a successive time pattern and wherein further, said first signal and said second signal occur substantially time coincident whilst said second signal and said third signal occur with intentional time coincidence disparity, including in combination:

a. vehicular apparatus including a source of direct current energy;
 b. first control means, coupled to said source of direct current energy, operative so as to therefrom issue a first signal;
 c. second control means, coupled to said first control means, cooperative with said first signal so as to therefrom issue a second signal;
 d. first sonantic device means coupled to said second signal;
 e. third control means, coupled to said second control means, operative therewith so as to issue a third signal the effectuation of which is substantially delayed in time respective to the said second signal; and,
 f. second sonantic device means coupled to said third signal.

2. Vehicular signalling apparatus as in claim 1 wherein said vehicular apparatus is a motor vehicle.

3. Vehicular signalling apparatus as in claim 1 wherein said first control means is an operator activated switch means.

4. Vehicular signalling apparatus as in claim 3 wherein said operator activated switch means is substantially located so as to be integral with a steering wheel means.

5. Vehicular signalling apparatus as in claim 1 wherein said second control means is an electromechanical relay.

6. Vehicular signalling apparatus as in claim 1 wherein said first sonantic device means and said second sonantic device means comprise electromechanical horn means.

7. Vehicular signalling apparatus as in claim 1 wherein said third control means includes a relay, and further where said relay includes at least a thyristor, usually being a silicon controlled rectifier having effectively an anode, a cathode, and a gate, and further including a time constant network operatively connected to said gate means.

8. Vehicular signalling apparatus as in claim 1 wherein said third control means includes a relay, and further, where said relay includes at least a transistor having effectively an emitter, a collector, and a base, and further including a time constant network operatively connected to said transistor said base.

9. Vehicular signalling apparatus as in claim 1 wherein said third control means includes a solid state switch means including at least an input and an output, said input effectively coupled to said second signal, said output operative to issue said third signal the effectuation of which is substantially delayed in time respective to said second signal.

10. Vehicular signalling apparatus as in claim 1 wherein said third control means includes a relay, and further where said relay includes a dashpot means operative to retard the actuation of the said relay.

11. Vehicular signalling apparatus as in claim 1 wherein said third control means includes a relay, and further where said relay is operatively actuated by a heating element coupled to a bimetal actuation member, the combination being effective to retard the actuation of the said relay.

12. Vehicular signalling apparatus as in claim 1 wherein said third control means includes an effective delay means for the operation thereof, after application of the said second signal, so as to effect a third signal issue delay between about 0.3 and 5 seconds.

13. Vehicular signalling apparatus as in claim 8 wherein said time constant network as connected to said transistor base includes positive feedback means, from said third signal therefrom produced, operative so as to effectuate a "snap action" actuation of said relay contact means.

* * * * *